United States Patent
An et al.

(10) Patent No.: US 9,963,153 B2
(45) Date of Patent: May 8, 2018

(54) METHOD AND DEVICE FOR DETECTING SAFE DRIVING STATE OF DRIVER

(71) Applicant: NATIONAL UNIVERSITY OF DEFENSE TECHNOLOGY, Kaifu District, Changsha, Hunan (CN)

(72) Inventors: Xiangjing An, Changsha (CN); Jian Li, Changsha (CN); Tao Wu, Changsha (CN); Lei Ye, Changsha (CN); Zhenping Sun, Changsha (CN); Hangen He, Changsha (CN)

(73) Assignee: NATIONAL UNIVERSITY OF DEFENSE TECHNOLOGY, Changsha, Hunan (CN)

( * ) Notice: Subject to any disclaimer, the term of this patent is extended or adjusted under 35 U.S.C. 154(b) by 0 days. days.

(21) Appl. No.: 15/112,166

(22) PCT Filed: Jan. 15, 2015

(86) PCT No.: PCT/CN2015/070728
§ 371 (c)(1),
(2) Date: Sep. 19, 2016

(87) PCT Pub. No.: WO2015/106690
PCT Pub. Date: Jul. 23, 2015

(65) Prior Publication Data
US 2017/0001648 A1 Jan. 5, 2017

(30) Foreign Application Priority Data
Jan. 15, 2014 (CN) .......................... 2014 1 0017252

(51) Int. Cl.
B60W 40/09 (2012.01)
H04N 7/18 (2006.01)
(Continued)

(52) U.S. Cl.
CPC ............ B60W 40/09 (2013.01); B60W 30/08 (2013.01); B60W 30/085 (2013.01);
(Continued)

(58) Field of Classification Search
CPC ...... B60W 30/08; B60K 35/00; G06T 7/0065; G10L 15/1822
See application file for complete search history.

(56) References Cited

U.S. PATENT DOCUMENTS

| 2006/0293893 A1* | 12/2006 | Horvitz | ............... G10L 15/1822 704/251 |
| 2012/0033077 A1* | 2/2012 | Kitaura | ................. G06T 7/0065 348/148 |
| 2015/0175068 A1* | 6/2015 | Szostak | .................. B60K 35/00 340/435 |

* cited by examiner

Primary Examiner — Yuri Kan
(74) Attorney, Agent, or Firm — Raymond Y. Chan; David and Raymond Patent Firm

(57) ABSTRACT

Disclosure is a method for detecting the safety driving state of a driver, the method comprises the following steps: (a) detecting the current sight direction of a driver in real time and acquiring a scene image signal in a front view field of the driver when a vehicle runs; (b) processing the acquired current road scene image signal according to a visual attention calculation model to obtain the expected attention distribution of the driver under the current road scene; and (c) performing fusion analysis on the real-time detected current sight direction of the driver in the step (a) and the calculated expected attention distribution of the driver in step (b), and judging whether the current driver is in a normal driving state and whether the driver can timely make a proper response to the sudden road traffic accident. The device is used for implementing the method and has the advantages of simple principle, easy realization, direct reflection of the real driving state of a driver, and improvement of the driving safety.

7 Claims, 7 Drawing Sheets

(51) Int. Cl.
*G10L 15/04* (2013.01)
*B60W 30/08* (2012.01)
*B60W 30/085* (2012.01)
*B60W 30/09* (2012.01)
*B60W 30/095* (2012.01)
*G08B 21/06* (2006.01)
*G06F 17/11* (2006.01)
*G06K 9/00* (2006.01)
*G06N 99/00* (2010.01)

(52) U.S. Cl.
CPC .......... *B60W 30/09* (2013.01); *B60W 30/095* (2013.01); *G06F 17/11* (2013.01); *G06K 9/00791* (2013.01); *G06K 9/00845* (2013.01); *G06N 99/005* (2013.01); *G08B 21/06* (2013.01)

METHOD AND DEVICE FOR DETECTING SAFE DRIVING STATE OF DRIVER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention mainly relates to the field of vehicular active safety design, and particularly relates to a method and a device for detecting the safety driving state of a driver.

Description of Related Arts

With the development of vehicle industry, vehicles have increasingly become an important part of social production and daily life; meanwhile, vehicle safety also gradually becomes a focus of attention. According to the statistics, about 75% of road traffic accidents are caused by human errors, namely caused by personal factors of drivers. Specifically, the personal factors include inaccurate estimation of drivers on vehicle running environments, response lag of drivers and the like. Thus, the safety of road traffic can be effectively improved by detecting whether the driving state of a driver is safe or not via technical means.

At present, the detection technologies for the safety driving states of drivers can be divided into three types: a detection method based on physical fatigue characteristics of a driver, a judgment method based on a running relation between a vehicle and a road, and a psychological response monitoring method based on stimulus-response monitoring.

The working principle of the detection method based on physical fatigue characteristics of a driver is based on a basic assumption: when the mental state of a driver is poor, the driving state is also poor, so the driver cannot safely accomplish the driving task. Generally, the physical fatigue characteristics capable of being used for detection include eye closing degree, brain wave, steering wheel holding strength and the like. Some practitioners published a driver fatigue detecting method based on monocular vision for judging the mental state of a driver by detecting the blinking frequency of the driver. This method includes the steps of installing a camera facing the face of the driver above a cab instrument panel, acquiring a driver face image by using the camera, performing face detection and tracking on each frame of the acquired image, performing eye detection and positioning within the detected face area, recognizing eye opening and closing states by using left and right eye areas, and finally performing fatigue detection via the detection states of continuous frames. Some other practitioners published a method and a system for detecting the mental state of a driver by continuously detecting abnormal shake of a driver head, wherein the working principle is to detect the shaking frequency and mode of the driver head by using a sensor installed at the headrest of the driver and then judge the mental state of the driver from the abnormal shaking mode. In conclusion, the method for deducing the safety driving state of the driver from the fatigue state of the driver has the problems of the following three aspects: I, the method is an indirect detection method with unreliable effect: it is difficult to give a direct corresponding relation between the fatigue state and the safety of the driving behavior of the driver by merely taking the fatigue state of the driver as the detection means of the safety driving state of the driver, and it is uncertain that fatigue is judged by external physical characteristics; II, deducing whether the driving state of the driver is safe or not from the fatigue state is limited to unsafe state detection: the driver in an unsafe driving state is not always in a fatigue state; and III, it is difficult to ensure the timeliness when whether the driving state of the driver is safe or not is deduced from the fatigue state is adopted: when the driver is in a fatigue state, the driving behavior is quite unsafe.

The working principle of the judgment method based on a running relation between a vehicle and a road is to forecast impending accidents such as collision by directly measuring the relations between the current vehicle and other vehicles and between the current vehicle and the road. Some practitioners published a lane departure reminding device based on a single chip, which detects the driving state of a driver via the abnormal lane-crossing driving action of a vehicle. The method has the defects of I, a judgment is generally given at an impending dangerous traffic accident; and II, it is difficult to definitely and objectively judge normal traffic accidents and abnormal traffic accidents, e.g., normal overtaking lane-crossing behavior and abnormal lane departure behavior.

The working principle of the detection method based on stimulus-response is to evaluate the psychological response of a driver by using a specific stimulation mode. Some practitioners recently published a method for detecting the mental state of a driver via a sight capturing technology. This method includes the steps of generating an artificial visual stimulus first, and then detecting whether the driver notices the stimulus or not by using the sight capturing technology, so as to evaluate the judging ability of the driver on the current emergency. The method can be used for directly judging whether the driver can make a response to the sudden stimulus or not, but has the following defects similarly: I, the attention of the driver is easily distracted; and II, the stimulus of the specific mode is additional for the psychological activity of the driver itself, so that the burden of the driver is increased.

With further studies on the causes of traffic accidents, people gradually notice that unsafe driving states of drivers are the main cause of traffic accidents. The unsafe driving states at least include two types: slow response caused by fatigue driving, and unreasonable distribution of attention of drivers in non-fatigue driving. For example, drivers have insufficient experience and poor driving habits, new learners are too tense and do not notice traffic accidents which should be noticed. For another example, drivers are attracted by other targets such as advertising boards and the like, read messages, are distracted and the like. The existing detection technologies for the safety driving state of a driver are difficult in detecting the second type of unsafe driving states.

Upon years of studies, people understand the relations between the sight direction (the direction of a fixation point relative to a driver) of a driver and road scenes and between the sight direction of the driver and road traffic accidents increasingly deeply. In the normal driving state, the driver should carry out reasonable attention distribution and conversion in different road scenes and road traffic accidents. If the driver cannot make a quick response to instant important traffic accidents, the driver is in a dangerous or abnormal driving state.

SUMMARY OF THE PRESENT INVENTION

Technical problems to be solved by the present invention lie in that aiming at the technical problems of the prior art, the present invention provides a method and a device for detecting the safety driving state of a driver, which are simple in principle and easy to implement and can directly reflect the real driving state of the driver and improve the driving safety.

Additional advantages and features of the invention will become apparent from the description which follows, and may be realized by means of the instrumentalities and combinations particular point out in the appended claims.

According to the present invention, the foregoing and other objects and advantages are attained by a method for detecting the safety driving state of a driver, comprising:

(1) Detecting the current sight direction of a driver in real time and acquiring a scene image signal in a front view field of the driver when a vehicle runs;

(2) Processing the acquired current road scene image signal according to a visual attention calculation model to obtain the expected attention distribution of the driver under the current road scene; and (3) Performing fusion analysis on the real-time detected current sight direction of the driver in the step (1) and the calculated expected attention distribution of the driver in step (2), and judging whether the current driver is in a normal driving state and whether the driver can timely make a proper response to the sudden road traffic accident.

Accordingly, wherein whether the driver timely makes a response to an important traffic event in the current scene or not is evaluated in a quantitative mode; and the quantitative evaluation is specifically to analyze whether the sight of the driver falls into the area of the important traffic event in the scene or not and analyze the fall proportion and speed at any certain moment.

The method for detecting the safety driving state of a driver, wherein the current sight direction of the driver is detected in real time by a sight capturing device, and the scene image signal in the front view field of the driver when the vehicle runs is acquired in real time by a vehicle-mounted forward-looking camera.

Wherein a driver attention calculation method based on significant traffic events and significance is adopted in the step (2) and comprises the following specific steps:

(6.1) starting image acquisition, and storing the current m×n forward-looking image;

(6.2) generating three dynamic arrays P1, P2 and P3 and three m×n matrices for storing intermediate data: Map1, Map2 and Map3, wherein the forward-looking image roughly comprises three types of driver attention areas: attention areas R0 related to traffic events, significant areas RS in the forward-looking image and fixed areas ROF often noticed by the driver, and the matrixes Map1, Map2 and Map3 are used for storing the three types of areas;

(6.3) determining ROF type attention areas $\{R_{OF}^i\}$ or and generating a first attention distribution map Map1, wherein Map1(x)=1, if x ∈ $\{R_{OF}^i\}$; else Map1(x)=0;

(6.4) storing the indexes of the areas in Map1 into the array P1 in sequence, wherein P1=$\{R_{OF}^1, R_{OF}^2, \ldots, R_{OF}^N\}$;

(6.5) generating traffic event related attention areas: detecting and tracking $R_0$ type areas $\{R_{O_k}^i\}$ of front lanes, vehicles, pedestrians, traffic signs and the like by using a computer vision method, wherein k=1, 2, 3 or 4, representing four types of areas of front lanes, vehicles, pedestrians and traffic signs; and generating a second attention distribution map: Map2(x)=1, if x ∈ $\{R_{O_k}^i\}$; else Map2(x)=0;

(6.6) storing the indexes of the areas in Map2 into the array P2 in sequence, wherein P2=$\{R_{O_1}^1, R_{O_1}^2, \ldots, R_{O_1}^M; R_{O_2}^1, R_{O_2}^2, \ldots, R_{O_2}^N; \ldots; R_{O_4}^1, R_{O_4}^2, \ldots, R_{O_4}^Q\}$;

(6.7) calculating a significant area of a forward-looking image I(t) according to a visual significance algorithm, and generating a significant map Map3 of binary areas $\{R_S^i\}$: Map3(x)=1, if x ∈ $\{R_S^i\}$; else Map3(x)=0; and (6.8) storing the indexes of the areas in Map3 into the array P3 in sequence, wherein the array P3=$\{R_S^1, R_S^2, \ldots, R_s^N\}$.

Wherein in the step (3), the interactive processes between the traffic related areas and the driver attention distribution and between the significant areas and the driver attention distribution are uniformly modeled, and the specific flow is as follows:

the "needing to be noticed" degrees of the areas are modeled as activities of the areas by means of a neuron activity description method in physiology, expressed by V; when the driver does not notice these areas, the activities V of the areas may rise according to a certain law; when the driver puts the sight to a certain area, the activity of the area is quickly pulled down; the first type of areas need to be noticed by the driver, and if these areas are not noticed for long time, the activities V may rise a lot and an alarm is given when the activities V exceed a certain threshold; the second type of areas are not expected to be noticed by the driver for a long term, and if the driver notices these areas for a long term, the activities V may continuously decline and an alarm is given when the activities V are lower than a certain threshold;

as to the first type of areas, the activities thereof are modeled into a dynamic process below according to the evolution law of time:

$$\frac{\partial V}{\partial t} = -[\alpha' + \phi\gamma](V - 0) + \beta(1 + \mu - V) \qquad (1)$$

as to the second type of areas, the activities thereof are modeled as follows according to the evolution law of time:

$$\frac{\partial V}{\partial t} = -[\alpha' + \phi\gamma](V - 0 + \nu) + \beta(1 - V) \qquad (2)$$

it can be known from the above equations (1) and (2) that when the initial value of the activity V is 0 to 1+μ, in equation (1) or −ν to 1 in equation (2), the activity V is evolved from 0 to 1+μ, or from −ν to 1; the values of μ and ν are 1 herein;

in equation (1), the evolved initial value of V is 0, and the alarm threshold is 1; in equation (2), the evolved initial value of V is 1, and the alarm threshold is 0; in the above two equations, α is an activity leakage factor, and is 0 in this model; φ, γ and β are positive evolution parameters corresponding to a certain area; φ and γ have an inhibition effect on the evolution of the activity, and β has an effect of increasing the activity; the values of γ and β are related to the type of the area, while the value of φ is not only related to the type of the area but also related to the sight area of the current driver.

wherein the road scene obtained by the forward-looking camera and the driver sight captured by the sight capturing device are calibrated, to ensure that the position of the scene object noticed by the driver sight obtained by the sight capturing device is consistent with the position of the object in the forward-looking camera.

As an integral technical concept, the present invention further provides a device for detecting the safety driving state of a driver, comprising:

a first module, used for detecting the current sight direction of a driver in real time and acquiring a scene image signal in a front view field of the driver when a vehicle runs;

a second module, used for processing the acquired current road scene image signal according to a visual attention calculation model to obtain the expected attention distribution of the driver under the current road scene; and a third module, used for performing fusion analysis on the real-time detected current sight direction of the driver and the calculated expected attention distribution of the driver, to judge whether the current driver is in a normal driving state and whether the driver can timely make a proper response to the sudden road traffic accident.

Accordingly, sight capturing device is an eye tracker.

Compared with the prior art, the present invention has the following advantages:

1. The detection result of the present invention can directly reflect the real safety driving state of a driver. The safety driving state of the driver is directly related to the current attention distribution and response sensitivity of the driver, whereas other physiological indexes merely reflect the current mental state and thus indirectly correspond to the safety driving state. In the present invention, whether the driver can make an accurate and quick response to the current road traffic accident or not is directly judged by detecting the attention distribution mode and the attention conversion mode of the driver and the detection result directly corresponds to the current driving state of the driver.

2. In the present invention, abnormal driving states caused by fatigue of drivers can be detected, unsafe driving states such as distraction, other event's attraction and the like in non-fatigue states of drivers, as well as unsafe states such as slow response caused by taking some drugs, drinking too much wine, lacking driving experience and the like, so that the overall safety is greatly improved.

3. The detection result of the present invention can reflect the abnormal driving behavior in time, thus belonging to "non-lag". Generally, the fatigue degree is detected by detecting the driving characteristics or the physiological indexes of a driver within a past period of time, and the obtained conclusion is a judgment on whether the driver is suitable for driving or not in a plurality of events within the previous period of time (in fact, the driver has been in an unsafe driving state within quite a long period of time before fatigue of the driver in the traditional methods, so the methods belong to lagged detection, and the driver cannot make a timely response to the current sudden road traffic accident and even be reminded).

4. The detection result of the present invention is more accurate. Because the driving state of a driver is not indirectly judged by using the fatigue state or the response of the driver to specific events, the detection result can reflect the judging and processing abilities of the driver on the current road traffic accident. In the normal driving state, the driver is bound to allocate and pay the attention to a remarkable area in the current road scene, so the driving state of the driver can be effectively estimated by comparing the actual attention with the expected attention. Meanwhile, both the actual measurement on the attention of the driver and the calculation on the scene attention have very high precision, so the mental state of the driver can be accurately judged.

5. The detection process of the present invention is noncontact. The detection method and the detection process of the present invention do not need to provide additional stimulus for a driver, so as not to disturb the normal driving behavior of the driver. On the other hand, the detection process of the present invention does not need to measure the physiological parameters of the driver by direct contact with the driver, so the measurement process is noncontact.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

The present invention relates to a method for detecting the safety driving state of a driver based on the fusion of driver sight tracking and driver expected attention calculation. Firstly, the current sight of a driver is tracked by adopting a sight capturing device. Secondly, object understanding and significance calculation are performed on a real-time front scene image shot by a vehicle-mounted camera by using a scene understanding technology and an attention calculation technology to obtain an area of a traffic related event which should be noticed or may be noticed by the driver and a noticeable area in the current scene. Finally, fusion analysis is performed on actual driver's attention recorded by the sight capturing device in real time and ideal attention distribution forecasted on the basis of the current scheme and calculated by using a scene understanding and attention calculation model, then whether the current attention distribution of the driver is reasonable or not is judged, so that an accurate judgment is made to the current driving state of the driver and the response ability of the driver to the sudden traffic event.

Figure 1:
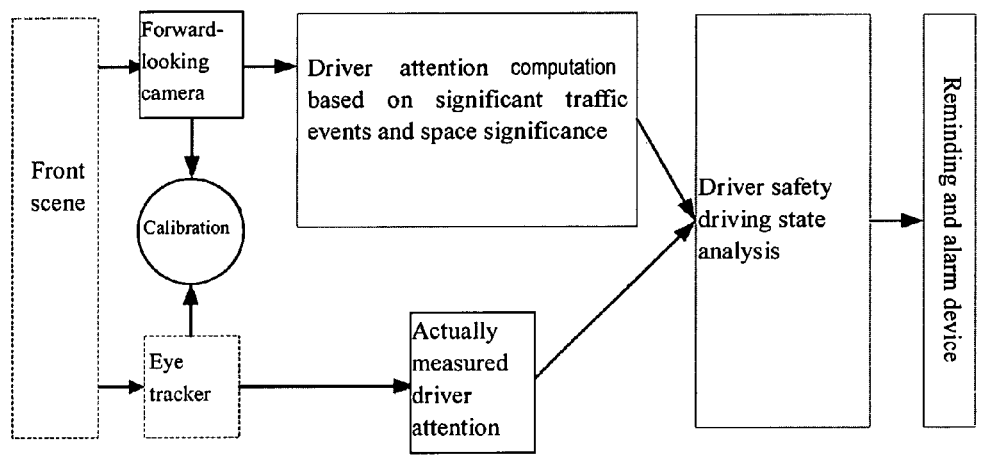
FIG. 1 is a principle schematic diagram after the method of the present invention is applied.

As shown in FIG. 1, a method for detecting the safety driving state of a driver in the present invention is based on matching of sight tracking and attention calculation, and includes the following steps:

(1) The current sight direction of a driver is detected in real time and a scene image signal of a front road when a vehicle runs is acquired. In this example, the current sight direction of the driver is detected in real time by a sight capturing device, and the scene image signal of the front road when the vehicle runs is acquired in time by a vehicle-mounted forward-looking camera.

(2) The acquired current road scene image signal is processed according to a visual attention calculation model to obtain the expected attention distribution of the driver under the current road scene (e.g., detection and tracking of a traffic event related area and a noticeable area). In this example, an embedded computer system for calculating the expected attention distribution of the current road scene is set, and the embedded computer processes the current road scene acquired by the vehicle-mounted forward-looking camera to obtain the expected attention distribution of the driver under the current road scene.

(3) Fusion analysis is performed on the real-time detected current sight direction of the driver in the step (1) and the calculated expected attention distribution of the driver in the step (2). Specifically, whether the driver timely makes a response to an important traffic event in the current scene or not is evaluated in a quantitative mode. For example, the quantitative evaluation is specifically to analyze whether the sight of the driver falls into the area of the important traffic event in the scene or not and analyze the fall proportion and speed at any moment. The evaluation result at the moment is used for judging whether current driver is in a normal driving state and whether the driver can timely make a proper response to the sudden road traffic accident.

Figure 2:
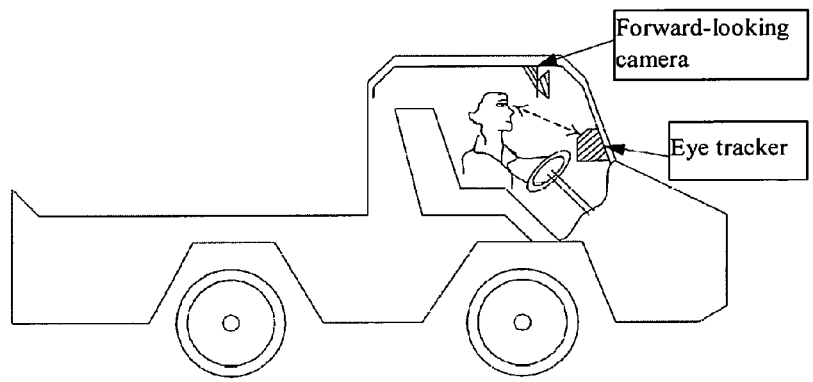
FIG. 2 is a schematic diagram of a frame structure after the device of the present invention is applied.

As shown in FIG. 2, the device of the present invention in practical application includes:

a first module, used for detecting the current sight direction of a driver in real time and acquiring a scene image signal in a front view field of the driver when a vehicle runs;

a second module, used for processing the acquired current road scene image signal according to a visual attention calculation model to obtain the expected attention distribution of the driver under the current road scene; and a third module, used for performing fusion analysis on the real-time detected current sight direction of the driver and the calculated expected attention distribution of the driver, to judge whether the current driver is in a normal driving state and whether the driver can timely make a proper response to the sudden road traffic accident.

The first module includes a sight capturing device for capturing and recording eye sight, a forward-looking camera for capturing the front road scene, and an embedded computer (mainly used for analyzing the sight of the driver, calculating a traffic event related area and evaluating the mental state of the driver according to the present invention). The sight capturing device should be fixed at a proper position on a similar driving panel, and can normally capture the sight of the driver (in order to improve the performance of capturing the sight of the driver, a plurality of cameras may also be adopted in other embodiments). The vehicle-mounted forward-looking camera is arranged at the top of the inner side of a front windshield of the vehicle, the principal optic axis is parallel to the body, the camera is installed forwards and used for shooting front road information of the vehicle, and the forward-looking camera may be fixed below the roof above the cab.

Figure 5:
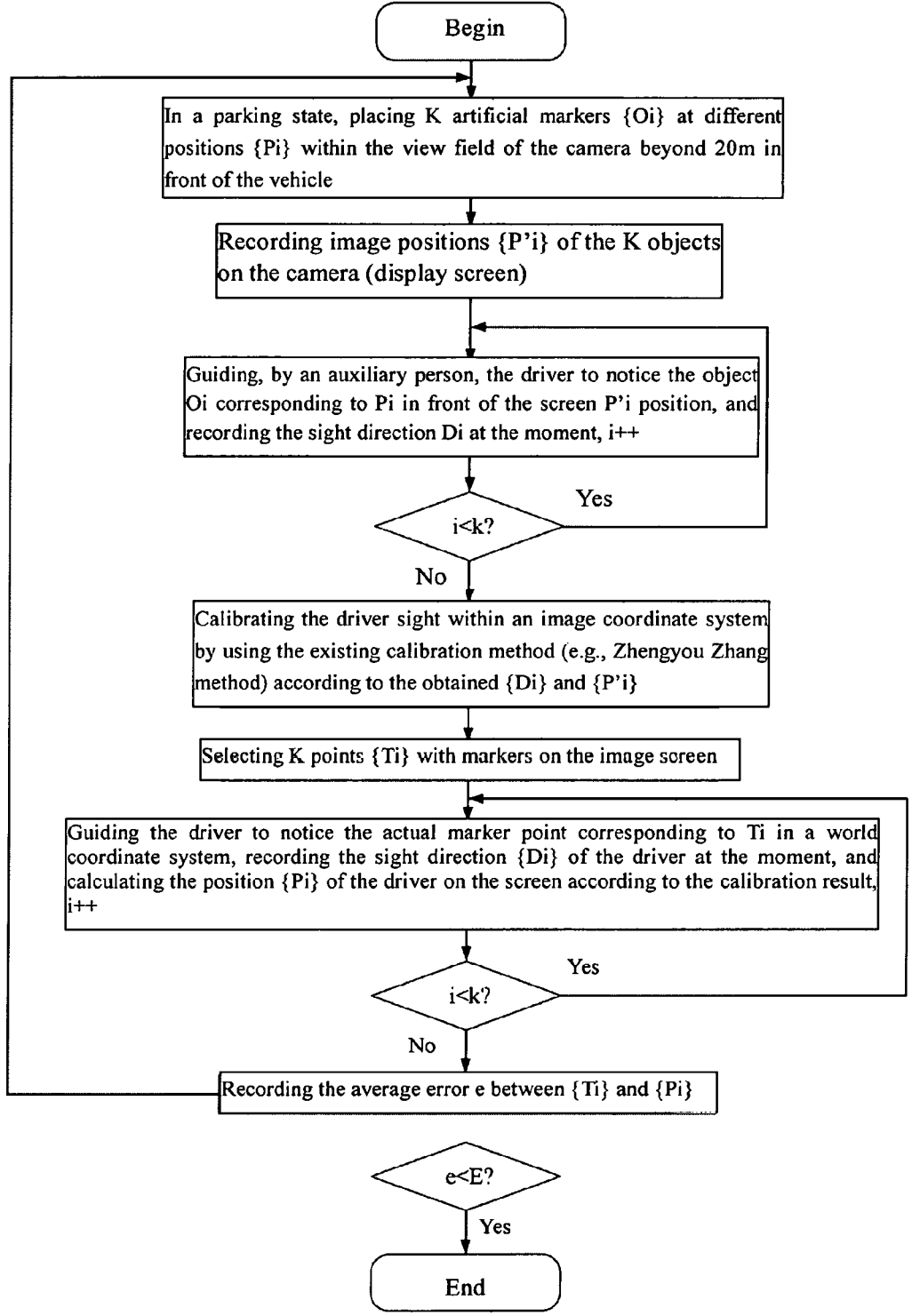
FIG. 5 is a flow schematic diagram of system calibration in a specific application example of the present invention.

Because the actually measured driver attention distribution obtained by the sight capturing device (e.g. an eye tracker) needs to be compared with the driver attention distribution obtained according to the vehicle-mounted camera and the attention calculation model, the road scene obtained by the forward-looking camera and the driver sight captured by the sight capturing device need to be calibrated, to ensure that the position of the scene object noticed by the driver sight obtained by the sight capturing device is consistent with the position of the object in the camera. In the present invention, the flow diagram of the initial calibration process is shown as FIG. 5. In this example, the specific calibration steps are as follows:

(4.1) in a parking state, manually placing some objects within a certain distance (e.g., 20 m or farther) in front of the vehicle (forward-looking camera), wherein these objects should have the features which are obvious and convenient for describing (e.g., red balls), and these objects and other inherent distant objects in the scene are used as the calibration reference;

(4.2) in the parking state, specifying an object (point) presented on a screen of the shot content of the forward-looking camera and guiding the driver to notice by an auxiliary person, and recording the sight direction of the driver at the moment by the sight capturing device;

(4.3) changing the position of the noticed object or the noticed object itself, and repeating step (4.2), wherein different objects (points) generally need to be changed for five to seven times; and (4.4) verifying the calibration result: at the moment, guiding the driver to notice different objects (points) in the scene, displaying the driver sight estimated by the sight capturing device on a real-time image shot by the forward-looking camera, and observing and recording whether the objects (points) are superposed with or approach the detected sight position or not; if the error meets the preset requirement (e.g., smaller than 1-1.5 degrees), ending the initial calibration process; otherwise, repeating steps (4.2) and (4.3), and beginning recalibration. Some parameters and parameters k, E and the like are present in the flow, and can be determined by experiments. This method generally adopts 5 points for calibration or adopts 9 points for continuous calibration, thus k may be 5 or 9 herein. When the calibration result does not meet the requirement, the number of the calibration points can be increased; E herein is determined according to the offset distance corresponding to the sight allowable error ($\theta$=1-1.5 degrees) of the driver on the display screen in this scheme, and E≈D*cos($\theta$), wherein D is the distance between the eyes of the driver and the display screen (placed at the eye tracker) used for debugging.

Because the eye height of the driver is inconsistent with the installation height of the camera, the view field of the front camera and the actual view field of the eyes of the driver may have a certain error. Specifically, different objects (points) in front of the vehicle under the same viewing angle produce different viewing angles within the view field of the camera for the driver along with different distances. By calculation, if the installation height difference is controlled within 20 cm, the viewing angle error between different objects beyond 20 m in front of the vehicle may be controlled within 0.6 degree, which is lower than the precision (about 1 degree) which can be given by the sight capturing device. The position of the object noticed by the driver at every moment in the forward-looking image can be matched with the driver sight observed by the sight capturing device at the moment one by one via the above initial calibration process. Thus, the specific position of the front object noticed by the driver in the forward-looking image can be inferred according to the driver sight direction observed by the sight capturing device at any moment, and then the position noticed by the driver in the actual scene can be known. It should be noted that distortion can be further removed from the image shot by the forward-looking camera by controlling the distortion degree of the forward-looking camera or via an algorithm in order to ensure the convenience and the accuracy of calibration.

The above calibration method directly calibrates the driver sight and the image coordinate system together. In addition, a distributed calibration method may also be adopted in other embodiments, and includes the following steps:

(5.1) firstly calibrating human eye sight and a world coordinate system: (a) placing a plurality of markers beyond 20 m in front of the vehicle, and recording the positions $\{Pi\}$ thereof; (b) separately recording the sight directions $\{Di\}$ when human eyes notice the objects; and (c) calculating the calibration result between the both according to a common "Zhengyou Zhang method";

(5.2) calibrating the image coordinate system and the world coordinate system as an existing technology, and calculating the calibration result between the both; and (5.3) obtaining a final conversion matrix between the human eye sight and the image coordinate system by using a common calibration method according to the results of steps (5.1) and (5.2).

A driver attention estimation method based on significant traffic events and significance is adopted in the step (2) above. Two types of areas arousing the attention of a driver generally include: I, very significant areas in environment, wherein the significance of these areas is determined by the particularity (e.g., significant color, texture, shape and the like of the areas) of the areas themselves and may be unrelated to traffic driving events; and II, significant areas caused by traffic events related to driving tasks, e.g., front moving vehicles, pedestrians, traffic signs, instrument panels, etc., wherein the traffic events corresponding to these areas are closely related to the driving tasks, and these areas must be closely noticed by the drivers in the normal driving state. The second type of driver attention areas includes two kinds of areas: I, dynamic driver attention areas, e.g., front moving vehicles, pedestrians, traffic signs, lanes, etc., which move relative to the body as time changes; and II, static driver attention areas, e.g., a rearview area, an instrument panel area, etc., which do not move relative to the vehicle but are fixed at the area positions of the image.

Figure 4:
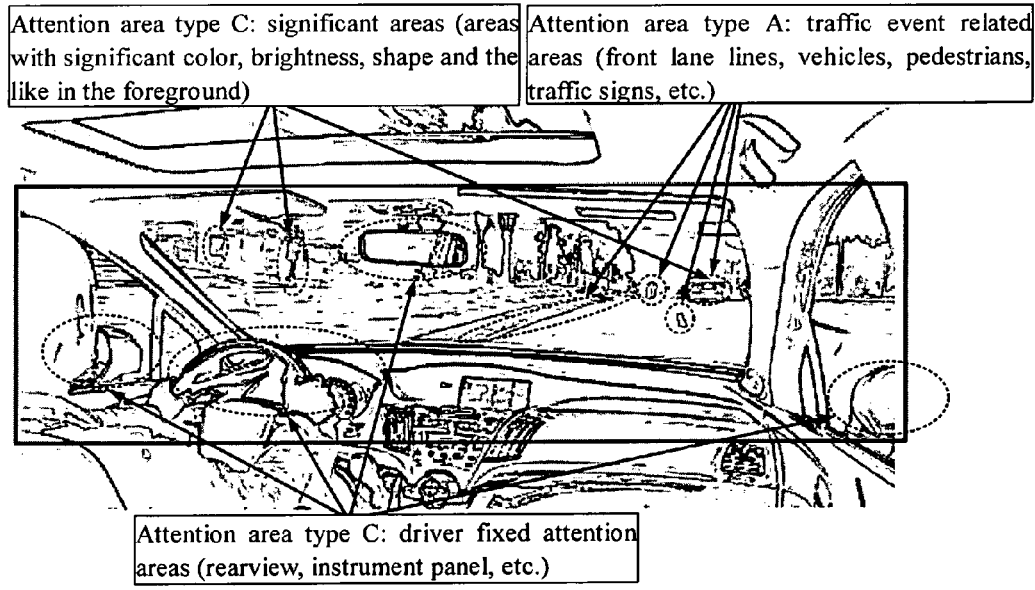
FIG. 4 is a schematic diagram of the view field of a forward-looking camera of a system and three attention distribution areas in an actual scene.
Figure 6:
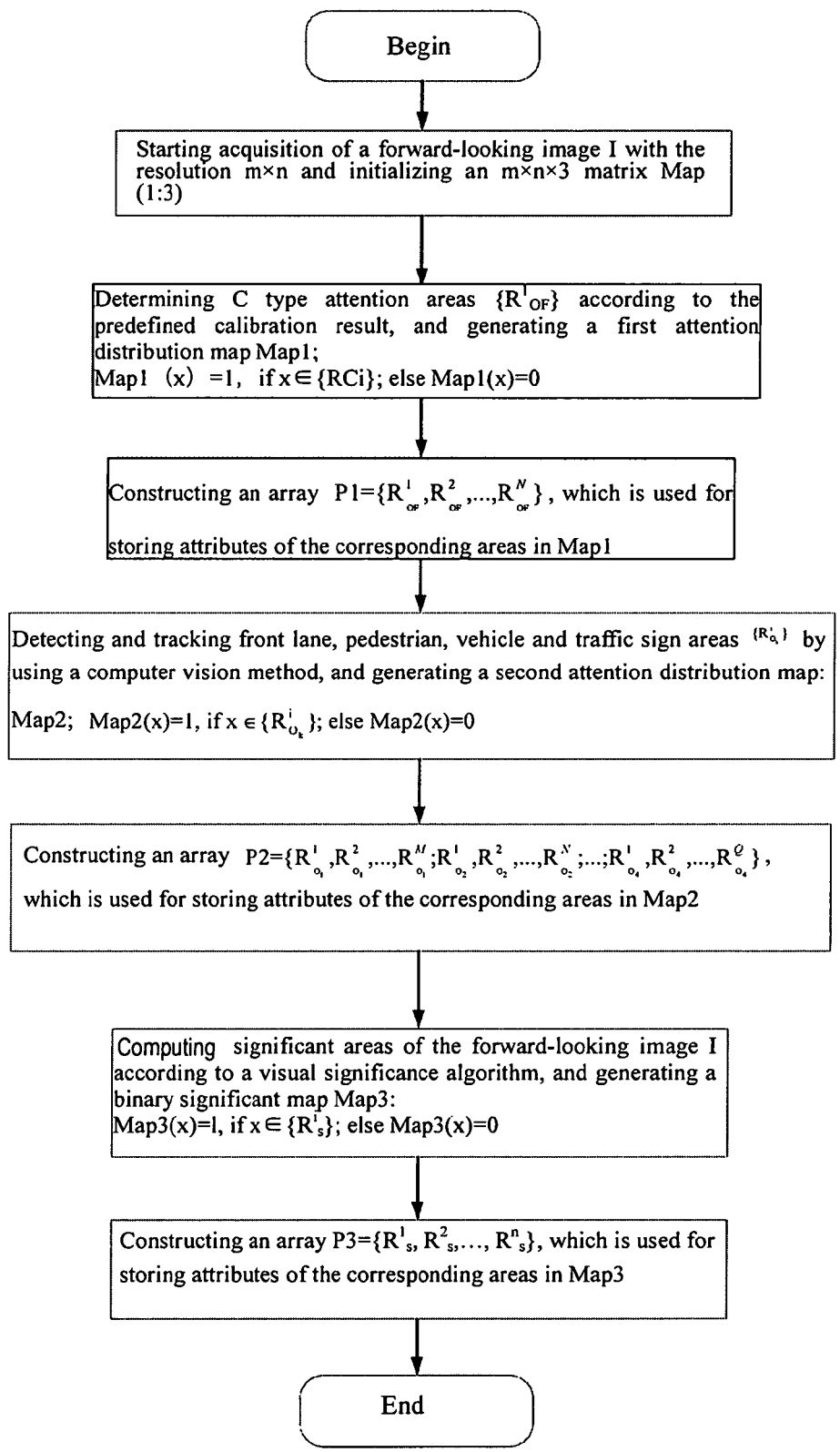
FIG. 6 is a schematic diagram of a driver attention calculation flow based on a significant traffic event and significance in a specific application example of the present invention.

In the present invention, the probable distribution area of the driver attention needs to be estimated, so that the estimated driver attention can be compared with the actually measured driver attention. As shown in FIG. 6, the driver attention calculation method based on significant traffic events and significance is to estimate and calculate the driver attention based on the acquired current forward-looking image. The calculation result is to forecast the probable distribution area of the driver attention, and thus can be used for comparing with the actually measured driver attention so as to judge whether the driver is in a safety driving state or not. The specific steps of the method are as follows:

(6.1) starting image acquisition, and storing the current m×n forward-looking image, wherein common 1024×768 images are adopted in this scheme;

(6.2) generating three dynamic arrays P1, P2 and P3 and three m×n matrixes for storing intermediate data: Map1, Map2 and Map3, wherein it can be seen from FIG. 4 that the forward-looking image roughly includes three types of driver attention areas: attention areas R0 related to traffic events, significant areas RS in the forward-looking image and fixed areas ROF often noticed by the driver, and the matrixes Map1, Map2 and Map3 are used for storing the three types of areas;

(6.3) because the ROF areas are static, determining ROF type attention areas $\{R_{OF}^i\}$ according to the predefined calibration result, and generating a first attention distribution map Map1, wherein Map1$(x)$=1, if $x \in \{R_{OF}^i\}$; else Map1$(x)$=0, and the fixed attention areas can be easily calibrated in the forward-looking image after the forward-looking camera is fixed in the vehicle;

(6.4) storing the indexes of the areas in Map1 into the array P1 in sequence, wherein P1=$\{R_{OF}^1, R_{OF}^2, \ldots, R_{OF}^N\}$ and the corresponding areas in Map1 can be searched according to any element in P1 in later use;

(6.5) generating traffic event related attention areas: detecting and tracking R0 type areas $\{R_{O_k}^i\}$ of front lanes, vehicles, pedestrians, traffic signs and the like by using the existing computer vision method (which detects the objects in the scene by using an HOG+SVM (Histogram of Oriented Gradient+Support Vector Machine) method), wherein k=1, 2, 3 or 4, respectively representing four types of areas of front lanes, vehicles, pedestrians, and traffic signs; and generating a second attention distribution map: Map2$(x)$=1, if $x \in \{R_{O_k}^i\}$; else Map2$(x)$=0;

(6.6) storing the indexes of the areas in Map2 into the array P2 in sequence, wherein P2=$\{R_{O_1}^1, R_{O_1}^2, \ldots, R_{O_1}^M; R_{O_2}^1, R_{O_2}^2, \ldots, R_{O_2}^N; \ldots; R_{O_4}^1, R_{O_4}^2, \ldots, R_{O_4}^Q\}$; and the corresponding areas in Map2 can be searched according to any element in P2 in later use;

(6.7) calculating a significant area of a forward-looking image I(t) according to a visual significance algorithm, and generating a significant map Map3 of binary areas $\{R_S^i\}$: Map3$(x)$=1, if $x \in \{R_S^i\}$; else Map3$(x)$=0; and (6.8) storing the indexes of the areas in Map3 into the array P3 in sequence, wherein the array P3=$\{R_S^1, R_s^2, \ldots, R_s^N\}$, and the corresponding areas in Map3 can be searched according to any element in P3 in later use.

The safety driving of the driver is mainly threatened by two factors: I, physiological fatigue of the driver, including slow response caused by dozing, drinking too much wine and taking some drugs as well as entering a dozing state, so that the driver cannot effectively notice the traffic events which should be noticed; and II, slow response caused by non-physiological fatigue of the driver, wherein the driver does not reasonably distribute the attention due to some reasons (e.g., the driver notices the events which should not be noticed excessively for long time, such as characters, pictures and the like of road advertisers, or notices the characters on the mobile phone for long time).

The traffic event related areas are detected and tracked, and if attention is not paid to these tracked areas for long time, it indicates that the driver does not accurately notice these areas. Thus, the "needing to be noticed" degrees of the areas become very high, and the system gives an alarm if the degrees reach a certain threshold. If the attention sight of the driver is put to these areas, the "needing to be noticed" degrees should be obviously reduced.

The significant areas (not the traffic event related areas) need similar but slightly different processing. Firstly, the significant areas are detected and tracked. When the driver pays attention to these areas, it means that the driver can make a response to the interesting areas and does not have serious physiological fatigue. However, when the driver continuously notices the areas for long time, it means that the driver is attracted by non-traffic events (characters and beauty pictures on advertising boards) for long time. At the moment, the "needing to be noticed" degrees of these areas are continuously reduced, and an alarm is also given when the degrees reach a certain low threshold.

Before the specific working flow and the settlement process (as FIG. 7) of the present invention are specifically introduced, established models and parameter setting of the present invention are introduced first.

Problem modeling: the interactive processes between the traffic related areas and the driver attention distribution and between the significant areas and the driver attention distribution are uniformly modeled. Firstly, the "needing to be noticed" degrees of these areas are modeled as activities of the areas by means of a neuron activity description method in physiology, expressed by V. When the driver does not notice these areas, the activities V of the areas may rise according to a certain law; and when the driver puts the sight to a certain area, the activity of the area (and other relevant areas) is quickly pulled down. For example, the traffic event related areas (referred to as "first type of areas") in the scene need to be noticed by the driver. If these areas are not noticed for long time, the activities V may rise a lot, and an alarm is given when the activities V exceed a certain threshold. Those significant but not traffic related areas (referred to as "second type of areas") are not expected to be noticed by the driver for a long term. If the driver notices these areas for a long term, the activities V may continuously decline and an alarm is given when the activities V are lower than a certain threshold. In the model, the system does not give an alarm on the premise that the activities of all the traffic event related areas are lower than the corresponding threshold and the activities of all non-traffic related significant areas are higher than a certain threshold. After the system gives an alarm, the activities V of all areas are reset to initial positions thereof.

As to the first type of areas, the activities thereof are modeled into a dynamic process below according to the evolution law of time:

$$\frac{\partial V}{\partial t} = -[\alpha' + \phi\gamma](V-0) + \beta(1+\mu-V) \quad (1)$$

As to the second type of areas, the activities thereof are modeled as follows according to the evolution law of time:

$$\frac{\partial V}{\partial t} = -[\alpha' + \phi\gamma](V-0+v) + \beta(1-V) \quad (2)$$

It can be known from the above equations (1) and (2) that when the initial value of the activity V is 0 to 1+μ in equation (1) or −v to 1 in equation (2), the activity V is evolved from 0 to 1+μ or from −v to 1. The values of μ and v are 1 herein.

Parameter setting: in equation (1), the evolved initial value of V is 0, and the alarm threshold is 1; in equation (2), the evolved initial value of V is 1, and the alarm threshold is 0; in the above two equations, a is an activity leakage factor, and is 0 in this model. φ, γ and β are positive evolution parameters corresponding to a certain area. φ and γ have an inhibition effect on the evolution of the activity, and β has an effect of increasing the activity. The values of γ and β are related to the type of the area, while the value of φ is not only related to the type of the area but also related to the sight area of the current driver. If the driver pays attention to a certain significant area, it means that the mental state of the driver is good at the current moment, so the activities of other areas should also be inhibited. It is supposed that the current activity analysis area is i, while the sight area of the driver is j, then the value of φ corresponding to the current area is obtained according to the following formula:

$$\phi = \begin{cases} 0 & (\bigcup R_j) \cap F = \Phi \\ \phi_{ij} & R_j \cap F \neq \Phi \ i \neq j \\ 1 & R_j \cap F \neq \Phi \ i = j \end{cases} \quad (3)$$

Figure 8:
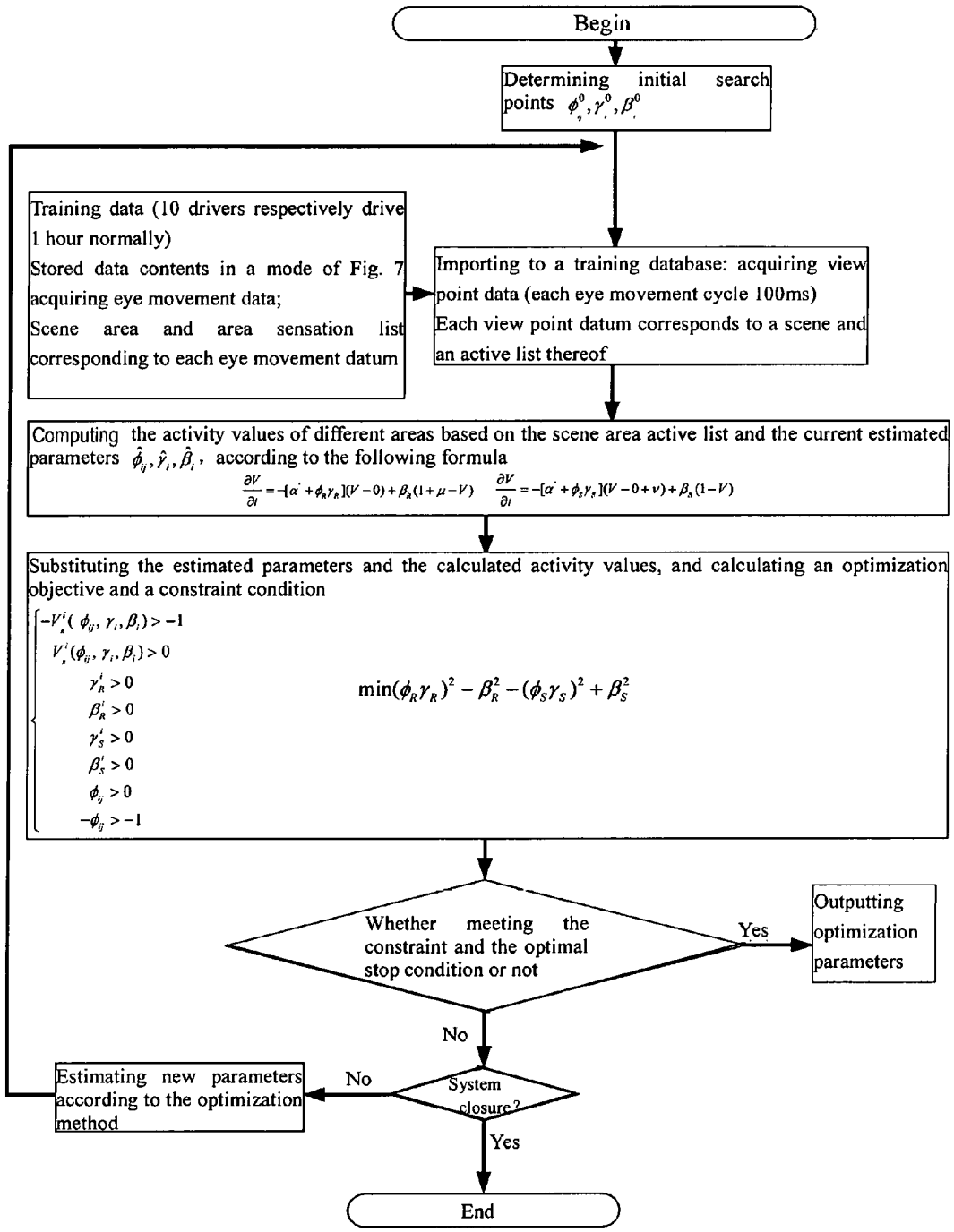
FIG. 8 is a flow schematic diagram of model parameter training in a specific application example of the present invention.

When the driver does not put the sight, φ is zero, and it means that the activity of an area is increased all the time; when the driver puts the sight to a certain significant relevant area, the activity increase of this area is inhibited; when the driver puts the sight to the area, the activity of the area is quickly reduced. The value range of φ is [0, 1]. The involved parameters γ, β and $\phi_{ij}$ are obtained by training, and the training process is shown in FIG. 8 and the specific description of the parameter training part thereafter. In practical calculation, the current sight area j of the driver is judged first, and then the parameter $\phi_{ij}$ of a random area i can be determined. The values of μ and v in equations (1) and (2) are 1. (Note: the values of μ and v are equivalent to the value β and β is a parameter to be trained, so the specific value of μ is not strictly defined.)

Further, in a preferred embodiment, the safety driving state detection module may further include a parameter training part and an on-line working part. Firstly, the on-line working part of detection and monitoring of the safety driving state are further described in combination with FIG. 7. The working process of the system includes three main steps:

(7.1) Step 1: detection and tracking of traffic event related areas and significant areas (7.1.1) Detection and tracking of traffic event related areas Traffic event related areas mainly include lanes (L), pedestrians (P), vehicles (V), traffic signs (R), a driving panel (D) and a rearview (M). These areas $\{R_{O_k}^i\}$ (lane lines, vehicles, pedestrians, traffic lights) in the method can be detected and tracked by adopting a computer vision method. The areas of the instrument panel and the rearview in the image are fixed, and thus can be directly predefined without specific detection and tracking.

(7.1.2) Detection and tracking of significant areas

The significant areas can arouse the attention of the driver, but cannot be previously described or trained. Thus, these areas can be detected and tracked by adopting a common significance detecting method.

(7.1.3) Establishment and management of an active area list

Firstly, according to the three types of areas $\{R_{OF}^i\}$, $\{R_O^i\}$ and $\{R_S^i\}$ obtained in steps (6.1-6.8):

determining traffic event related areas: $O=\{R_{OF}^i, R_O^j\}$;

(b) determining significant and traffic event related areas: $S_a=\{R_S^i|R_S^i\cap(\cup R_O^j)\neq\Phi\}$;

(c) determining significant and non-traffic event related areas: $S_b = \{R_S^i | R_S^i \cap (\cup R_O^i) \neq \Phi\}$;

Both (a) and (b) areas need to be noticed by the driver, while (c) areas do not expect the driver to notice for a long term. Thus, (a) and (b) areas are regarded as the same type of areas, and referred to as a first type of areas $\{R_R\}$, while (c) areas are referred to as a second type of areas $\{R_s\}$. According to the detected areas, the active area list is resumed as:

$$R_{active} = \{R_R^1, R_R^2, \ldots, R_R^M, R_S^1, R_S^2, \ldots, R_S^N\} \quad (4)$$

The two types of areas correspond to two active lists. After a certain area disappears, the element is removed, and the subsequent area numbers are rearranged; and when a certain area emerges, the area is arranged in the back of the type of areas. The system detects and tracks these areas strictly according to the lists.

(7.2) Step 2: area activity evolution

As to different area types, the evolution parameters and the alarm mechanisms are slight different.

(7.2.1) The evolution mode of the first type of areas is as follows:

$$\frac{\partial V}{\partial t} = -[\alpha' + \phi_R \gamma_R](V - 0) + \beta_R(1 + \mu - V) \quad (5)$$

1 is an alarm threshold, and the value of μ is 0.1. The initial value of V is set as 0. For a certain traffic event related area, when φ is 0 (the driver does not put the sight to the area or the related area), the activity V of the area is gradually increased from the initial value to 1+μ. When V>1, the system gives an alarm. It means that if the driver does not notice the traffic event related important area (or the related area), the driver currently focuses attention, and then the system can give an alarm for prompting.

(7.2.2) The second type of areas adopts the same evolution mode as the first type of significant and traffic event related areas.

$$\frac{\partial V}{\partial t} = -[\alpha' + \phi_S \gamma_S](V - 0 + v) + \beta_S(1 - V) \quad (6)$$

The evolved initial values of the activities of these areas are 1. In the above formula, 0 is an alarm threshold, while the value of ν is 0.1. A certain significant and non-traffic event related area is not expected to be noticed by the driver for long time. If the driver notices the area for long time, the value of φ is large, which means that the activity V continuously declines.

(7.3) Step 3: alarm when the activities of the areas are too strong or too weak.

The alarm criteria are as follows: if the activity degree value of a random traffic event related area is more than 1, an alarm is given; and if the activity degree value of a random significant and non-traffic event related area is less than 0, an alarm is given.

In the above evolution process, a series of parameters need to be trained: $\phi_{ij}$, $\gamma_i$ and $\beta_i$. The parameters are trained and learnt by adopting an optimization method in the present invention. The parameter training process will be introduced below in combination with FIG. 8.

Figure 7:
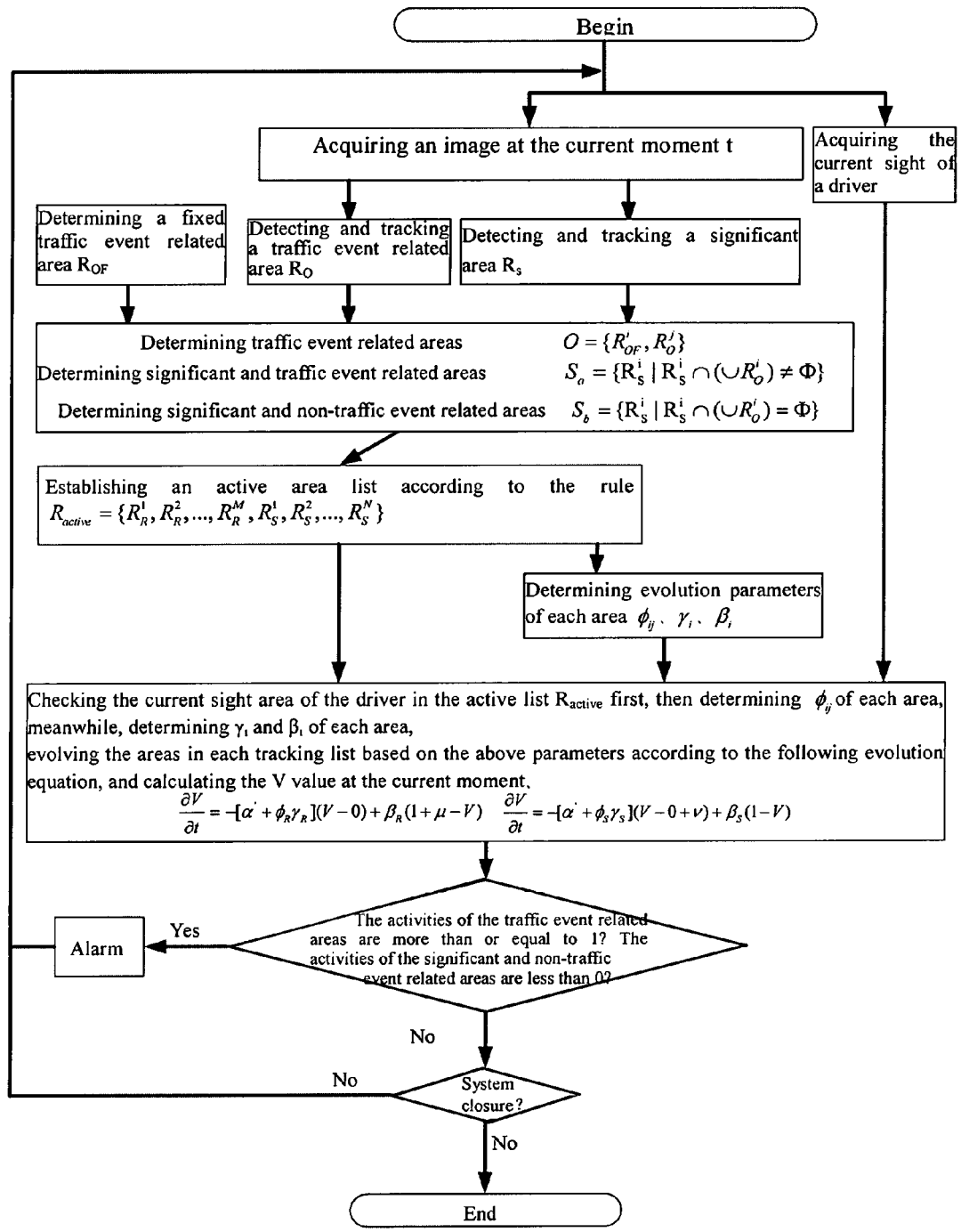
FIG. 7 is a flow schematic diagram of driver safety state analysis in a specific application example of the present invention.

Step 1: training sample acquisition. In an implementation example of the present invention, Driving data of 10 normal drivers every 1 hour are acquired. The acquisition of the training data is the same as the flow and the format of data acquisition when the system works normally (as shown in FIG. 7). The data include eye movement data (acquiring a view point every 100 ms) of the drivers and active lists (see formula (4)) of scene areas corresponding to view points, wherein the active lists can be directly indexed to the areas of Maps in FIG. 6.

Step 2: data evolution calculation. The activity value of each area at the moment is calculated according to the active lists and the current estimated parameters.

Step 3: parameter iterative optimization. The above evolved activity values and estimated parameters are guided into an optimization objective and a constraint condition:

$$\text{Optimization objective: } \min(\phi_R \gamma_R)^2 - \beta_R^2 - (\phi_S \gamma_S)^2 + \beta_S^2 \quad (7)$$

$$\begin{cases} -V_R^i(\phi_{ij}, \gamma_i, \beta_i) > -1 \\ V_S^i(\phi_{ij}, \gamma_i, \beta_i) > 0 \\ \gamma_R^i > 0 \\ \beta_R^i > 0 \\ \gamma_S^i > 0 \\ \beta_S^i > 0 \\ \phi_{ij} > 0 \\ -\phi_{ij} > -1 \end{cases} \quad (8)$$

Constraint:

Whether the current parameters satisfy the constraint and reach the optimization objective or not is checked. If so, iteration is stopped; otherwise, next estimated parameters $\hat{\phi}_{ij}$, $\hat{\gamma}_i$, $\hat{\beta}_i$ are calculated according to the existing optimization method; and the optimization method herein solves the optimization problem by adopting a commercial kit (for example but not limited to: a genetic algorithm or a simulated annealing algorithm or the like).

In a specific application example of the present invention, the first type of areas $\{R_R\}$ include two fixed traffic event related areas including an instrument panel area (D) and a rearview area (M), and four unfixed traffic event related areas including a lane line area (L), a front vehicle area (V), a front pedestrian area (P) and a traffic sign area (R); the second type of areas $\{R_S\}$ are not further subdivided, and collectively referred to as significant and non-traffic event related areas (S); and in this example, the current area follows a roadside advertising board area. In addition, the complementary set (C) of all these areas is regarded as an area.

The parameters are solved according to the above steps at a parameter optimization phase. In view of the situation that free parameters are numerous and the activity increase parameters in the activity evolution process of the model are converse to those in the activity inhibition process and are all free parameters, the activity increase parameters β are fixed without losing generality or going against the constraint of formula (8):

$$\beta_R^i = \beta_S^i = 0.1 \quad (9)$$

Thus, the search space of optimization solution is greatly reduced.

The parameters solved according to the kit are as follows:

The influence matrixes $-\phi_{ij}$ between different area types are:

|   | S    | L    | V    | P    | R    | D    | M    | C |
|---|------|------|------|------|------|------|------|---|
| S | 1.0  | 0.14 | 0.22 | 0.15 | 0.17 | 0.04 | 0.07 | 0 |
| L | 0.01 | 1.0  | 0.51 | 0.47 | 0.43 | 0.31 | 0.45 | 0 |
| V | 0.06 | 0.81 | 1.0  | 0.90 | 0.56 | 0.51 | 0.49 | 0 |
| P | 0.09 | 0.83 | 0.92 | 1.0  | 0.70 | 0.62 | 0.51 | 0 |
| R | 0.10 | 0.81 | 0.95 | 0.92 | 1.0  | 0.71 | 0.52 | 0 |
| D | 0.02 | 0.53 | 0.47 | 0.39 | 0.40 | 1.0  | 0.92 | 0 |
| M | 0.05 | 0.62 | 0.56 | 0.59 | 0.46 | 0.88 | 1.0  | 0 |
| C | 0    | 0    | 0    | 0    | 0    | 0    | 0    | 0 |

The parameters of $\gamma_i$ are:

|         | Area Type | | | | | | |
|---------|------|------|------|------|------|------|------|
|         | S    | L    | V    | P    | R    | D    | M    |
| $\gamma_i$ value | 0.31 | 0.82 | 0.97 | 1.22 | 1.36 | 0.92 | 0.85 |

The system can work with the above training parameters obtained by the optimization method. The validity of the system will be described via a specific example herein.

Example: in the running process of 10 seconds on an expressway, forward-looking images (10 frames every second) and attention points (acquired once every 100 ms) of a driver are acquired at the same time. According to the image contents, the first type of areas includes a lane area, a front vehicle area (no pedestrians or traffic signs within the period of time), an instrument panel area and a rearview area. The second type of areas is an advertising board area. In the example, the sight of the driver is always put to the advertising board.

The activity values of all areas can be calculated according to the tracking condition and the sight put condition of the above areas. It should be noted that in practical calculation, the continuous form of the dynamic equations (1) and (2) should be changed into a differential form. Equation (1) is changed into:

$$V(n+1)=V(n)-[(\alpha+\phi\gamma)(V(n)-0)+\beta(1+\mu-V(n))]T \quad (10)$$

Equation (2) is changed into:

$$V(n+1)=V(n)-[(\alpha+\phi\gamma)(V(n)-0+\nu)+\beta(1+V(n))]T \quad (10)$$

Wherein, n is the number of calculation steps, and T is a sampling time interval and is 0.1 s herein. The activity value of any area at the moment can be calculated according to the recursion formula of formula (10) or (11) and the trained parameters. Taking the advertising board area of the second type of areas as an example, the activity evolution condition thereof will be calculated below: after the parameters are substituted, the evolution equation (11) can be changed into:

$$V(n+1)=V(n)-0.1*[0.31*(V(n)+1)+0.1*(1-V(n))] \quad (12)$$

Figure 9:
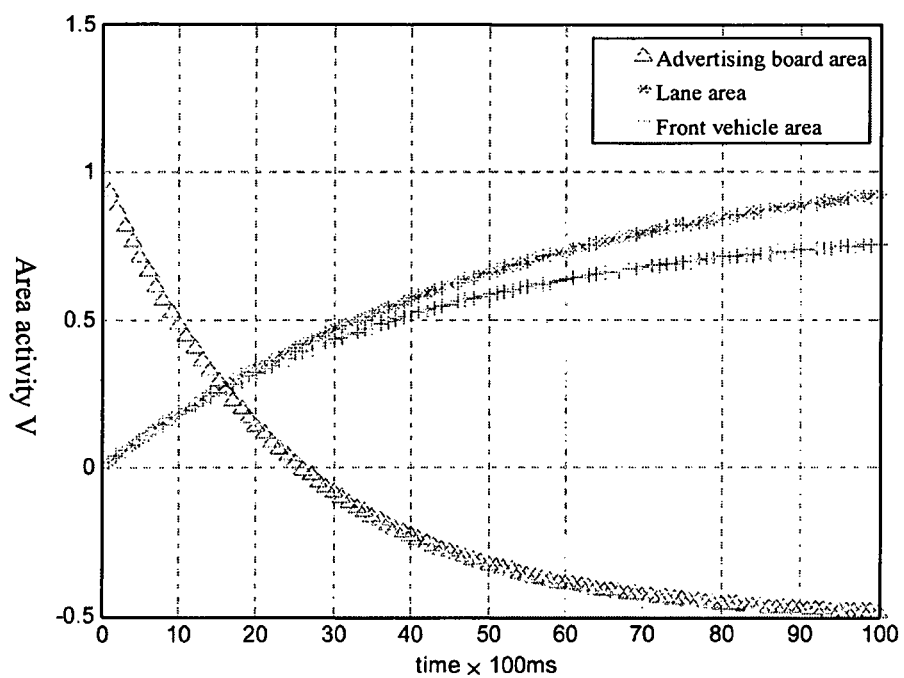
FIG. 9 is a contrast diagram of activity degree analysis of different scene areas in a specific application example of the present invention.

According to model restraint, the activity evolution initial value V(0) of the area is 1, and then the activity change condition of the area within the period of time can be calculated, as shown in FIG. 9. Similarly, the evolution conditions of the activity values of the first type of areas (lane, vehicle, instrument panel and rearview areas and the like) can also be calculated according to the same steps. FIG. 9 shows an evolution contrast by taking the advertising board area of trie second type of areas as well as the lane area and the front vehicle area of the first type of areas as an example. It can be seen from FIG. 9 that when the 26th frame of image (corresponding to 2.6 s) is calculated, the activity V of the advertising board area is reduced below the threshold (V=−0.0030<0). This indicates that the driver notices the area for long time. Although the values of the activities V of the lane area and the vehicle area at the moment are separately within the normal ranges (V=0.4173<1, V=0.3895<1), the system gives an alarm to reminds the driver of focusing on driving without improperly distributing the attention.

Figure 3:
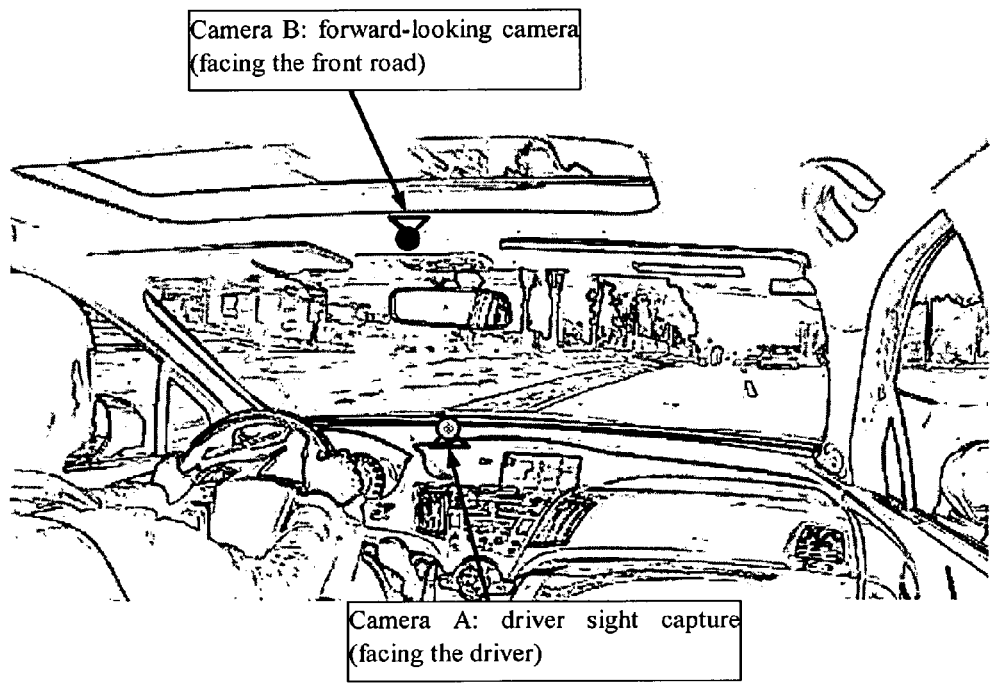
FIG. 3 is a schematic diagram of an actual scene in a specific application example of the present invention in a specific use state.

In specific application, the attention calculation part of the present invention can be realized in an embedded computer system, e.g. a single chip system based on a DSP (Digital Signal Processor) or an FPGA (Field Programmable Gate Array). In this embodiment, a separable sight capturing device is adopted, and a sensor part for capturing the sight of the driver is installed in the vehicle cab (as shown in FIG. 3). A screen part of the sight capturing device is merely used in calibration, and is used for displaying images shot by the front camera and displaying driver attention points estimated by the system.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for detecting a safety driving state of a driver, comprising steps of:
    (a) detecting a current sight direction of a driver in real time and acquiring a scene image signal in a front view field of the driver when a vehicle runs;
    (b) processing an acquired current road scene image signal according to a visual attention calculation model to obtain an expected attention distribution of the driver under a current road scene; and
    (c) performing fusion analysis on a real-time detected current sight direction of the driver in the step (a) and a calculated expected attention distribution of the driver in step (b), and judging whether the driver is in a normal driving state and whether the driver can timely make a proper response to a sudden road traffic accident.

2. The method as recited in claim 1, wherein whether the driver timely makes a response to an important traffic event in a current scene or not is evaluated in a quantitative mode; and a quantitative evaluation is specifically to analyze whether a sight of the driver falls into an area of an important traffic event in a scene or not and analyze a fall proportion and speed at any certain moment.

3. The method as recited in claim 1, wherein the current sight direction of the driver is detected in real time by a sight capturing device, and the scene image signal in the front view field of the driver when the vehicle runs is acquired in real time by a vehicle-mounted forward-looking camera.

4. The method as recited in claim 1, wherein a driver attention calculation method based on significant traffic events and significance is adopted in the step (b) and comprises the following specific steps:
    (f.1) starting image acquisition, and storing a current m×n forward-looking image;
    (f.2) generating three dynamic arrays P1, P2 and P3 and three m×n matrixes for storing intermediate data: Map1, Map2 and Map3, wherein the forward-looking image roughly comprises three types of driver attention areas: attention areas $R_O$ related to traffic events, significant areas $R_S$ in a forward-looking image and fixed areas $R_{OF}$ often noticed by the driver, and the matrixes Map1, Map2 and Map3 are used for storing the three types of areas;

(f.3) determining $R_{OF}$ type attention areas $\{R_{OF}^i\}$ and generating a first attention distribution map Map1, wherein Map1($x$)=1, if $x \in \{R_{OF}^i\}$; else Map1($x$)=0;

(f.4) storing indexes of the areas in Map1 into the array P1 in sequence, wherein P1=$\{R_{OF}^1, R_{OF}^2, \ldots, R_{OF}^N\}$;

(f.5) generating traffic event related attention areas: detecting and tracking $R_O$ type areas $\{R_{O_k}^i\}$ of front lanes, vehicles, pedestrians, traffic signs and the like by using a computer vision method, wherein k=1, 2, 3 or 4, representing four types of areas of front lanes, vehicles, pedestrians and traffic signs; and generating a second attention distribution map: Map2($x$)=1, if $x \in \{R_{O_k}^i\}$; else Map2($x$)=0;

(f.6) storing the indexes of the areas in Map2 into the array P2 in sequence, wherein P2=$\{R_{O_1}^1, R_{O_1}^2, \ldots, R_{O_1}^M; R_{O_2}^1, R_{O_2}^2, \ldots, R_{O_2}^N; \ldots; R_{O_4}^1, R_{O_4}^2, \ldots, R_{O_4}^Q\}$;

(f.7) calculating a significant area of a forward-looking image 1($t$) according to a visual significance algorithm, and generating a significant map Map3 of binary areas $\{R_S^i\}$: Map3($x$)=1, if $x \in \{R_S^i\}$; else Map3($x$)=0; and (f.8) storing the indexes of the areas in Map3 into the array P3 in sequence, wherein the array P3= $\{R_s^1, R_s^2, \ldots, R_s^N\}$.

5. The method as recited in claim 4, wherein in the step (c), an interactive processes between traffic related areas and a driver attention distribution and between the significant areas and the driver attention distribution are uniformly modeled, and a specific flow includes:

"needing to be noticed" degrees of areas being modeled as activities of areas by means of a neuron activity description method in physiology, expressed by V, wherein when the driver does not notice these areas, activities V of areas rises according to a certain law, wherein when the driver puts the sight to a certain area, the activity of the area is quickly pulled down, wherein first type of areas need to be noticed by the driver, and if these areas are not noticed for long time, the activities V rise a lot and an alarm is given when the activities V exceed a certain threshold, wherein second type of areas are not expected to be noticed by the driver for a long term, and if the driver notices these areas for a long term, the activities V continuously decline and an alarm is given when the activities V are lower than a certain threshold;

for the first type of areas, activities thereof being modeled into a dynamic process below according to an evolution law of time:

$$\frac{\partial V}{\partial t} = -[\alpha' + \phi\gamma](V - 0) + \beta(1 + \mu - V) \quad \text{(i)}$$

for the second type of areas, activities thereof being modeled as follows according to the evolution law of time:

$$\frac{\partial V}{\partial t} = -[\alpha' + \phi\gamma](V - 0 + \nu) + \beta(1 - V) \quad \text{(ii)}$$

wherein, according to the above equations (1) and (2), when an initial value of the activity V is 0 to 1+$\mu$ in equation (1) or $-\nu$ to 1 in equation (2), the activity V is evolved from 0 to 1+$\mu$ or from $-\nu$ to 1, wherein the values of $\mu$ and $\nu$ are 1 herein;

wherein, in equation (1), an evolved initial value of V is 0, and an alarm threshold is 1, wherein in equation (2), the evolved initial value of V is 1, and the alarm threshold is 0, wherein in the above two equations, .alpha. is an activity leakage factor, and is 0 in this model, wherein $\phi$, $\gamma$ and $\beta$ are positive evolution parameters corresponding to a certain area, wherein $\phi$ and $\gamma$ have an inhibition effect on the evolution of the activity, and $\beta$ has an effect of increasing the activity; the values of $\gamma$ and $\beta$ are related to the type of the area, while the value of $\phi$ is not only related to the type of the area but also related to a sight area of the current driver.

6. The method as recited in claim 3, wherein a road scene obtained by the forward-looking camera and the driver sight captured by the sight capturing device are calibrated, to ensure that a position of a scene object noticed by the driver sight obtained by the sight capturing device is consistent with a position of the object in the forward-looking camera.

7. A device for detecting a safety driving state of a driver, comprising:

a sight capturing device detecting a current sight direction of a driver in real time and a forward-looking camera acquiring a scene image signal in a front view field of the driver when a vehicle runs;

wherein an acquired current road scene image signal according to a visual attention calculation model is processed to obtain an expected attention distribution of the driver under a current road scene;

wherein a fusion analysis on a real-time detected current sight direction of the driver and a calculated expected attention distribution of the driver are performed, to judge whether the driver is in a normal driving state and whether the driver can timely make a proper response to a sudden road traffic accident.

\* \* \* \* \*